United States Patent [19]

Ryanen

[11] 4,288,129
[45] Sep. 8, 1981

[54] BEARING CAGE

[75] Inventor: Robert M. Ryanen, Union Lake, Mich.

[73] Assignee: Federal-Mogul Corporation, Southfield, Mich.

[21] Appl. No.: 139,384

[22] Filed: Apr. 11, 1980

[51] Int. Cl.³ .................................................. F16C 33/00
[52] U.S. Cl. ......................................... 308/218; 308/214
[58] Field of Search ............ 308/217, 218, 212, 207 R, 308/202, 214

[56] References Cited

U.S. PATENT DOCUMENTS

| 1,911,544 | 5/1933 | Beard | 308/217 |
|---|---|---|---|
| 2,435,839 | 2/1948 | McNicoll | 308/214 |
| 3,420,589 | 1/1969 | Green et al. | 308/174 |
| 3,477,773 | 11/1969 | Altson | 308/214 |
| 3,689,127 | 9/1972 | Hampp et al. | 308/214 |
| 3,694,043 | 9/1972 | Tellson | 308/218 X |
| 4,136,916 | 1/1979 | Musselman et al. | 308/213 |

Primary Examiner—Henry K. Artis
Attorney, Agent, or Firm—William G. Coon

[57] ABSTRACT

A conical bearing cage (10) for a tapered bearing assembly (12) comprising an integral plastic member having a central axis. The member includes a large circular ring (14) and a small circular ring (24) interconnected by a plurality of circumferentially spaced bridges (34). The bridges (34) have top surfaces (36) and sides extending downwardly therefrom with tapered portions (40) immediately beneath the top surfaces (36) thereof to define sharp lips (42). A rib (44) is disposed on the top surface (36) of each bridge (34) and extends between the rings (14, 24). The sides (46) of each rib (44) are spaced from the adjacent lips (42) and are also parallel to the central axis of the cage (10). Further, the small ring (24) is smaller in diameter than the large ring (14) thereby providing a one-piece plastic cage member (10) of sufficient strength and operating characteristics, yet capable of being molded in a two-part mold.

11 Claims, 5 Drawing Figures

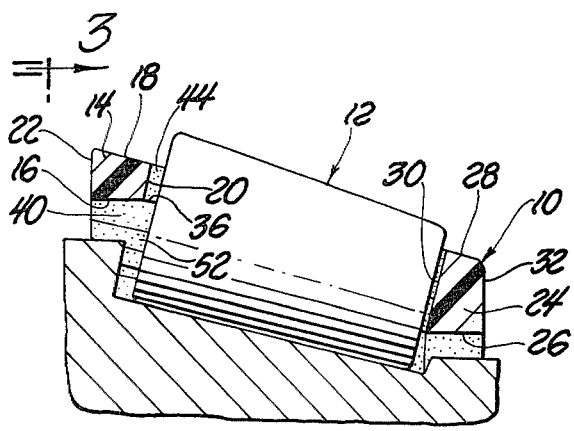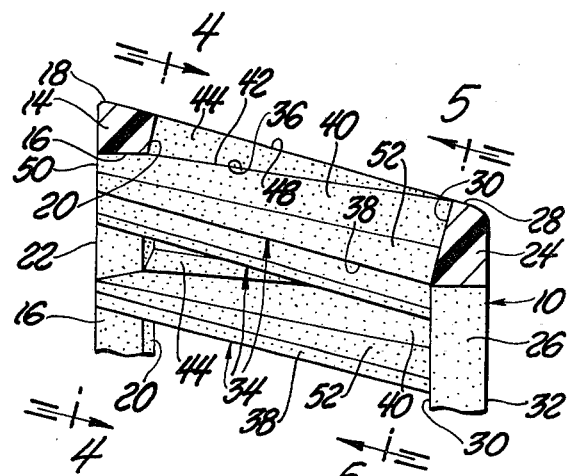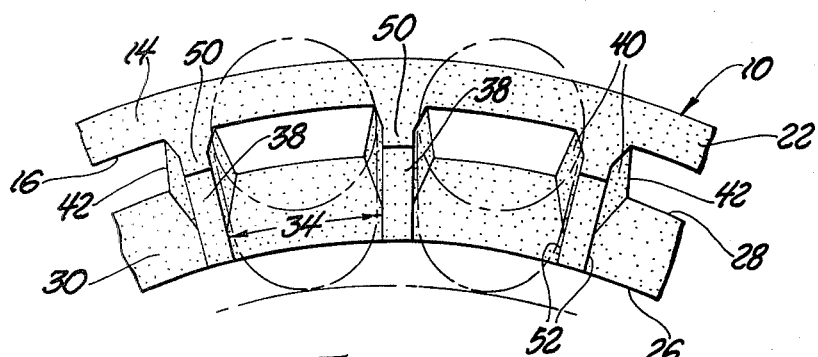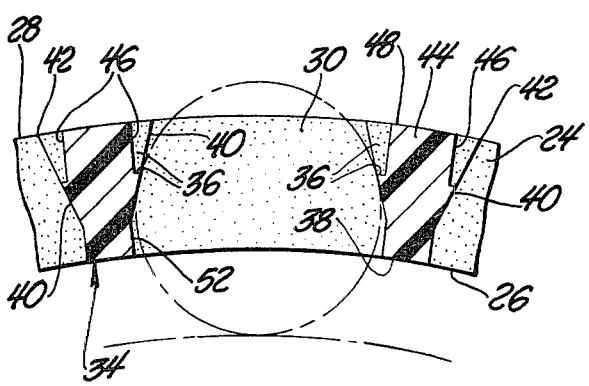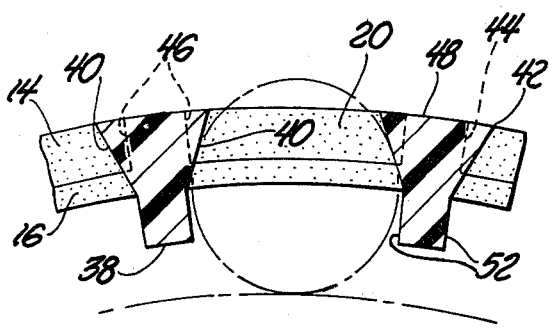

BEARING CAGE

BACKGROUND OF THE INVENTION

This invention relates to a conical bearing cage in a tapered bearing assembly. Such tapered bearing assemblies typically include a conical bearing cage with a plurality of circumferentially spaced pockets for receiving the roller bearing elements and with a race disposed within the bearing cage and in rolling engagement with the roller bearing elements. The cage maintains the proper spacing between adjacent rollers and maintains the rollers in pockets for rolling engagement with the inner race.

Race members have been made of various different materials and of various different configurations. Of course, development work continues to improve bearing cages in manufacturing efficiency and cost, performance, strength, weight reduction and in other characteristics.

SUMMARY OF THE INVENTION

The subject invention provides a conical bearing cage for a tapered bearing assembly which is efficiently and inexpensively manufactured, has the desired performance characteristics and is of the requisite strength, yet of light weight. The cage is an integral member having a central axis and including large and small circular rings interconnected by a plurality of circumferentially spaced bridges. Each of the bridges has top and bottom surfaces interconnected by spaced sides with the sides of the bridges including a tapered portion extending inwardly from the top surface thereof for defining lips with a rib disposed on the top surface of each bridge and extending between the large and small rings. The cage is preferably molded of a plastic material.

PRIOR ART STATEMENT

Plastic cage members of the type to which the instant invention pertain are known in the prior art and an example of one such cage member is disclosed in U.S. Pat. No. 4,136,916 granted Jan. 30, 1979 to Musselman et al. The subject cage member is an improvement over such cage members in that it has the requisite performance characteristics and strength characteristics, yet is light in weight and may be very efficiently manufactured by a two-piece mold which opens and closes axially.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary cross-sectional view showing a tapered roller bearing assembly including the cage member of the subject invention;

FIG. 2 is a fragmentary cross-sectional view of a portion of the bearing cage of the subject invention;

FIG. 3 is a fragmentary view taken substantially along line 3—3 of FIG. 1 and showing the roller bearing elements in phantom;

FIG. 4 is a fragmentary cross-sectional view taken substantially along line 4—4 of FIG. 2; and FIG. 5 is a fragmentary cross-sectional view taken substantially along line 5—5 of FIG. 2.

DESCRIPTION OF THE PREFERRED EMBODIMENT

A conical bearing cage constructed in accordance with the subject invention is generally indicated at 10. The conical bearing cage 10 is utilized in a tapered bearing assembly generally shown at 12. The tapered bearing assembly 12 also includes a plurality of individually tapered roller bearings spaced about the assembly and in rolling engagement with an inner bearing race which has shoulders at either end thereof for retaining the roller bearings axially positioned. The individual roller bearings are of the well-known type and the inner race may be of various well-known configurations.

The cage 10 is an integral plastic member having a central axis. The cage 10 includes a large circular ring 14 having an inner circumferential surface 16 and an outer circumferential surface 18 connected by inner and outer faces 20 and 22 respectively. The cage also includes a small circular ring 24 having an inner circumferential surface 26 and an outer circumferential surface 28 connected by inner and outer faces 30 and 32 respectively.

A plurality of circumferentially spaced bridges 34 interconnect the rings 14 and 24. Each of the bridges 34 has top and bottom surfaces 36 and 38, respectively, which are interconnected by spaced sides. The spaced sides of each of the bridges 34 has a tapered portion 40 extending inwardly from the top surface 36 thereof for defining lips 42 at the intersection of each side and the associated top surface 36.

A reinforcing rib 44 is disposed on the top surface 36 of each bridge 34 and extends between the rings 14 and 24. Each of the ribs 44 includes a pair of spaced sides 46 interconnected by a top surface 48. The sides 46 are spaced inwardly from the lips 42 so that the ribs 44 will not interfere with the action of the lips 42, i.e., the coaction of the lips 42 with the respective roller bearing elements. The top surface 48 of each rib 44 is substantially coextensive with the outer circumferential surfaces 18 and 28 of the rings 14 and 24 for defining an outer conical surface extending between the faces 20 and 30 of the rings 14 and 24. In other words, the top surface of each rib 44 is substantially an extension of the outer circumferential surface 18 of the large ring and tapers into or blends into the outer circumferential surface 28 of the small ring 24.

The top surface 36 of each bridge 34 is substantially coextensive with the outer circumferential surface 28 of the small ring 24 and extends to a position below the outer circumferential surface 18 of the large ring 14. Said another way, the top surface 36 of each bridge 34 diverges from the top surface 48 of each rib 44 in a direction extending from the small ring 24 to the large ring 14 and terminates at the inner face 20 of the large ring 14 at a position substantially aligned with the inner circumferential surface 16 of the large ring 14.

The spaced sides 46 of each of the ribs 44 are parallel to the central axis of the cage and the outer circumferential surface 28 of the small ring 24 is of a smaller diameter than the diameter of the inner circumferential surface 16 of the large ring 14. Further, the inner circumferential surfaces 16 and 26 of the rings 14 and 24 are each parallel to the central axis of the cage so as to be concentric with the central axis. The ribs 44 provide structural integrity to the cage and are constructed, along with the relative positions of the inner and outer surfaces of the respective rings, so that two axially opening mold halves may be utilized for injection molding the cage of plastic. It will be appreciated that the use of only two mold halves which open and close axially for making the cage is a significant manufacturing advantage.

The outer faces 22 and 32 of the rings 14 and 24 are substantially perpendicular to the central axis. However, the inner faces 20 and 30 of the rings 14 and 24 are parallel to one another and extend transversely to the outer conical surface, i.e., the top surface 48 of each rib 44. The inner faces 20 and 30 are substantially perpendicular to the center line of the roller to be retained by the cage but may be off from perpendicular by a few degrees. As will be appreciated, the inner faces 20 and 30 are disposed adjacent the ends of the respective roller elements for limiting axial movement of the roller elements.

One end 50 of each of the bridges 34 extends radially inwardly from the inner circumferential surface 16 of the large ring 14, the ends 50 of the bridges being coplanar with the outer face 22 of the large ring 14. The sides of each bridge 34 extend upwardly from the bottom surface 38 of the bridge 34 in generally parallel portions 52 and then through the tapered portions 40 thereof to the lips 42 whereby each bridge 34 has a cross section generally in the form of a Y. The lips 42 of each top surface 36 converge in a direction extending from the small ring 24 to the large ring 14 as is best illustrated in FIG. 3. Such convergence accommodates the tapered roller elements for retaining and circumferentially spacing the roller elements.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A conical bearing cage (10) for a tapered bearing assembly (12) comprising: an integral member having a conical central axis and including; a large circular ring (14) having an inner circumferential surface (16) and an outer circumferential surface (18) connected by inner (20) and outer (22) faces, a small circular ring (24) having an inner circumferential surface (26) and an outer circumferential surface (28) connected by inner (30) and outer (32) faces, a plurality of circumferentially spaced bridges (34) interconnecting said rings (14, 24), each of said bridges (34) having top (36) and bottom (38) surfaces interconnected by spaced sides, said sides of each of said bridges (34) having a tapered portion (40) extending inwardly from said top surface (36) thereof for defining lips (42) at the intersection of each side and associated top surface (36), characterized by a rib (44) on said top surface (36) of each bridge (34) extending between said rings (14, 24).

2. A cage as set forth in claim 1 wherein each of said ribs (44) includes a pair of spaced sides (46) interconnected by a top surface (48), said spaced sides (46) being spaced inwardly from said lips (42).

3. A cage as set forth in claim 2 wherein said top surface (48) of each rib (44) is substantially coextensive with said outer circumferential surfaces (18, 28) of said rings (14, 24) for defining an outer conical surface extending between said outer faces (22, 32) of said rings (14, 24).

4. A cage as set forth in claim 3 wherein said top surface (36) of each bridge (34) is substantially coextensive with said outer circumferential surface (28) of said small ring (24) and extends to a position below said outer circumferential surface (18) of said large ring (14).

5. A cage as set forth in claim 4 wherein said spaced sides (46) of each of said ribs (44) are parallel to said central axis.

6. A cage as set forth in claim 5 wherein said cage consists of plastic material, said outer circumferential surface (28) of said small ring (24) being of a smaller diameter than the diameter of said inner circumferential surface (16) of said large ring (14).

7. A cage as set forth in claim 6 wherein said inner circumferential surfaces (16, 26) are each parallel to said central axis so as to be concentric with said central axis.

8. A cage as set forth in claim 7 wherein said outer faces (22, 32) of said rings (14, 24) are substantially perpendicular to said central axis.

9. A cage as set forth in claim 8 wherein said inner faces (20, 30) of said rings (14, 24) are parallel and perpendicular to the central axis of the roller to be retained in said pocket.

10. A cage as set forth in claim 9 wherein one end (50) of each of said bridges (34) extends radially inward from said inner circumferential surface (16) of said large ring (14), each of said spaced sides of each bridge (34) extend upwardly from the bottom surface (38) of the bridge (34) in generally parallel portions (52) and then through said tapered portions (40) thereof to said lip (42) whereby each bridge (34) has a cross section generally in the form of a Y, said lips (42) of each top surface (36) converge in the direction extending from said small ring (24) to said large ring (14).

11. A cage as set forth in claim 1 including roller bearings in the spaces between adjacent bridges (34) and a bearing race within said cage and engaging said roller bearings to retain the latter in said spaces.

* * * * *